(12) United States Patent
Chen et al.

(10) Patent No.: US 9,146,119 B2
(45) Date of Patent: Sep. 29, 2015

(54) SCRUBBING VARIABLE CONTENT PATHS

(75) Inventors: Billy P. Chen, Bellevue, WA (US); Eyal Ofek, Redmond, WA (US); Michael F. Cohen, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 509 days.

(21) Appl. No.: 12/479,625

(22) Filed: Jun. 5, 2009

(65) Prior Publication Data

US 2010/0312470 A1 Dec. 9, 2010

(51) Int. Cl.
G01C 21/34 (2006.01)
G01C 21/30 (2006.01)
G01C 21/00 (2006.01)
G06F 17/30 (2006.01)

(52) U.S. Cl.
CPC ............ *G01C 21/3415* (2013.01); *G01C 21/00* (2013.01); *G01C 21/30* (2013.01); *G06F 17/30241* (2013.01)

(58) Field of Classification Search
CPC ..... G01C 21/30; G01C 21/3415; G01C 21/00
USPC ......................................................... 701/208
See application file for complete search history.

(56) References Cited

U.S. PATENT DOCUMENTS

| 5,917,486 | A  | * | 6/1999  | Rylander ........................ 715/764 |
| 6,321,158 | B1 | * | 11/2001 | DeLorme et al. ............. 701/201 |
| 6,333,702 | B1 | * | 12/2001 | Hiyokawa et al. ....... 340/995.21 |
| 7,180,501 | B2 |   | 2/2007  | Marvit et al. |
| 7,383,497 | B2 |   | 6/2008  | Glenner et al. |
| 7,432,940 | B2 |   | 10/2008 | Brook et al. |
| 2005/0024238 | A1 | * | 2/2005  | Kimura ........................ 340/995.1 |
| 2007/0150175 | A1 | * | 6/2007  | Shen et al. ..................... 701/200 |
| 2007/0260395 | A1 | * | 11/2007 | Matsuoka et al. ............. 701/209 |
| 2008/0114537 | A1 | * | 5/2008  | Aspen .......................... 701/207 |

(Continued)

FOREIGN PATENT DOCUMENTS

| CA | 2760821 | 12/2010 |
| CN | 1441229 | 9/2003 |

(Continued)

OTHER PUBLICATIONS

Kimber, et al."Trailblazing: Video Playback Control by Direct Object Manipulation", Retrieved at<<http://www.fxpal.com/publications/FXPAL-PR-07-404.pdf>>, pp. 4.

(Continued)

*Primary Examiner* — Anne Georgalas
(74) *Attorney, Agent, or Firm* — Steven Spellman; Jim Ross; Micky Minhas

(57) ABSTRACT

Various embodiments provide techniques for scrubbing variable paths in content. By way of example and not limitation, scrubbing can include receiving user input that defines a scrub path and navigating a data path through content based on the scrub path. According to some embodiments, a data path can include one or more predefined paths (e.g., a travel route) through the content. One or more of the techniques can account for variations in a data path and provide ways of maintaining adjacency between a scrub path and navigation along the data path. In some embodiments, a data path can be associated with one or more types of data path content that can be presented in response to a navigation of the data path.

20 Claims, 10 Drawing Sheets

(56) References Cited

U.S. PATENT DOCUMENTS

| | | | |
|---|---|---|---|
| 2008/0154489 A1* | 6/2008 | Kaneda et al. | 701/201 |
| 2008/0263592 A1 | 10/2008 | Kimber et al. | |
| 2009/0058822 A1 | 3/2009 | Chaudhri | |
| 2010/0257195 A1* | 10/2010 | Inoue et al. | 707/769 |

FOREIGN PATENT DOCUMENTS

| | | |
|---|---|---|
| CN | 1979095 | 6/2007 |
| CN | 1996039 | 7/2007 |
| CN | 102460421 | 5/2012 |
| JP | H10240902 | 9/1998 |
| JP | 2007163234 | 6/2007 |
| JP | 2009109233 | 5/2009 |
| JP | 2010151546 | 7/2010 |
| JP | 2012529055 | 11/2012 |
| KR | 1020070023511 A | 2/2007 |
| KR | 1020080096967 A | 11/2008 |
| KR | 20120030406 | 3/2012 |
| SG | 175424 | 12/2011 |
| WO | 2008089471 A1 | 7/2008 |
| WO | WO-2010141542 | 12/2010 |

OTHER PUBLICATIONS

Dragicevic, et al. "Video Browsing by Direct Manipulation", Retrieved at <<http://www.dgp.toronto.edu/~bonzo/docs/p237-dragicevic.pdf>>, CHI 2008 Proceedings • Improved Video Navigation and Capture Apr. 5-10, 2008 • Florence, Italy, pp. 237-246.

"Video Object Annotation, Navigation, and Composition", Retrieved at <<http://www.danbgoldman.com/uw/papers/ivoa.uist08.pdf>>.

"International Search Report", Mailed Date: Dec. 24, 2010, Application No. PCT/US2010/037013, Filed Date: Jun. 2, 2010, pp. 8.

"Foreign Office Action", CN Application No. 201080024807.9, Sep. 2, 2013, 21 pages.

"Foreign Office Action", AU Application No. 2010256728, Mar. 25, 2014, 3 Pages.

"Foreign Notice of Allowance", AU Application No. 2010256728, Sep. 22, 2014, 2 pages.

"Foreign Notice of Allowance", JP Application No. 2012-514067, Dec. 1, 2014, 4 Pages.

"Foreign Office Action", AU Application No. 2010256728, Jul. 31, 2014, 3 pages.

"Foreign Office Action", CN Application No. 201080024807.9, Jan. 28, 2015, 11 Pages.

"Foreign Office Action", CN Application No. 201080024807.9, Aug. 27, 2014, 15 pages.

"Foreign Office Action", JP Application No. 2012-514067, Mar. 20, 2014, 11 pages.

"Foreign Notice of Allowance", CN Application No. 201080024807.9, May 6, 2015, 4 Pages.

* cited by examiner

SCRUBBING VARIABLE CONTENT PATHS

BACKGROUND

Some applications can enable a user to navigate through content, such as a map displayed on a user interface, by moving an icon or other graphical representation through the content. Such applications, however, typically provide very simplistic navigation techniques that may have difficulty responding to variations that are often encountered in content features. For example, to navigate a route on a map, a user navigation typically has to maintain correspondence with the route to allow the navigation to remain on the route. If the user navigation fails to maintain correspondence with the route, the navigation may fail or change routes in an undesirable manner.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide techniques for scrubbing variable paths in content. By way of example and not limitation, scrubbing can include receiving user input that defines a scrub path and navigating a data path through content based on the scrub path. According to some embodiments, a data path can include one or more predefined paths (e.g., a travel route) through the content. One or more of the techniques can account for variations in a data path and provide ways of maintaining adjacency between a scrub path and navigation along the data path. In some embodiments, a data path can be associated with one or more types of data path content that can be presented in response to navigation along the data path.

BRIEF DESCRIPTION OF THE DRAWING

The same numbers are used throughout the drawings to reference like features.

DETAILED DESCRIPTION

Overview

Figure 1:
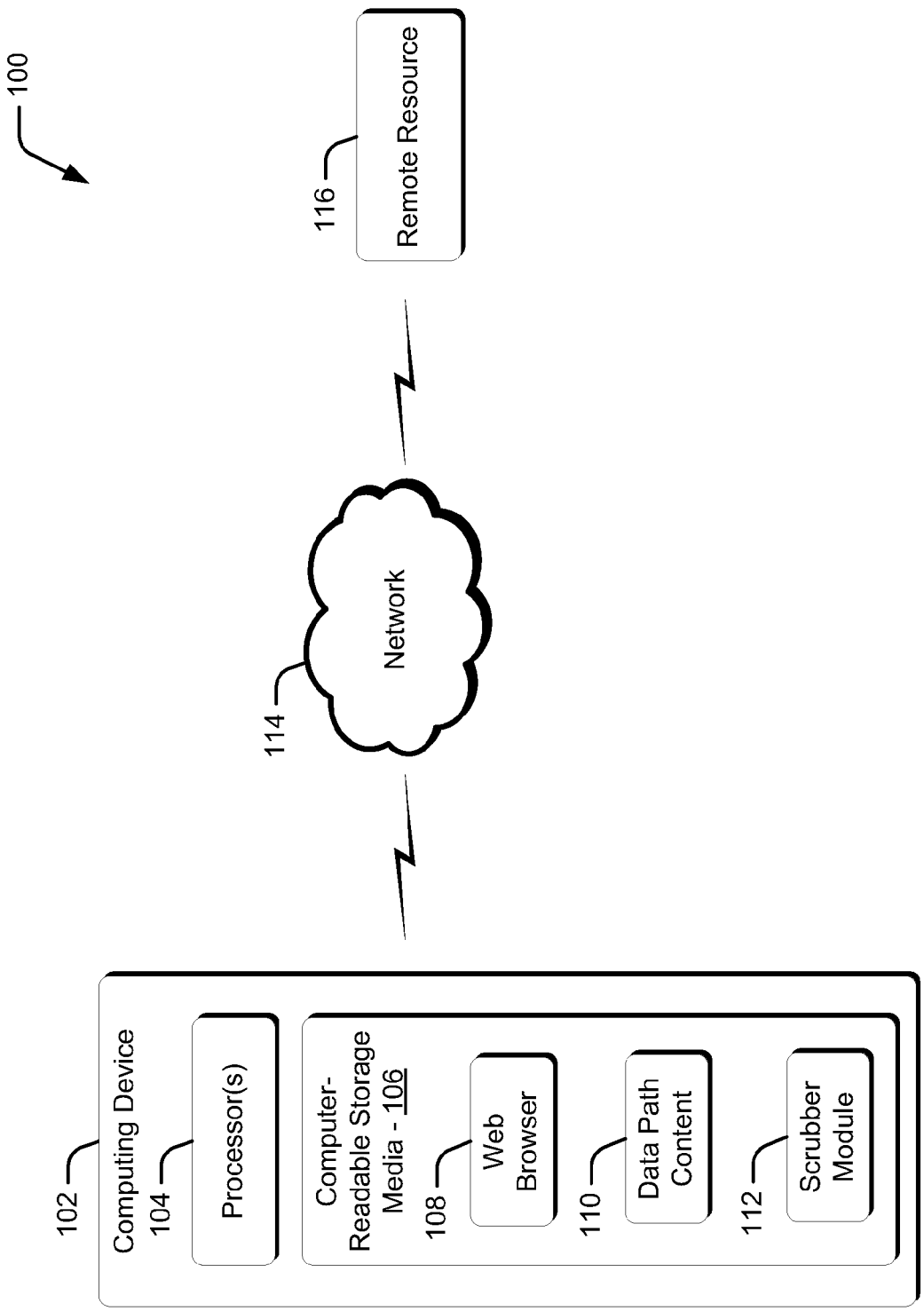
FIG. 1 illustrates an operating environment in which the inventive principles can be employed in accordance with one or more embodiments.

Various embodiments provide techniques for scrubbing variable paths in content. By way of example and not limitation, scrubbing can include receiving user input that defines a scrub path and navigating a data path through content based on the scrub path. According to some embodiments, a data path can include one or more predefined paths (e.g., a travel route) through the content. For example, consider an embodiment in which a user wishes to navigate a travel route through a map displayed on a user interface. According to some embodiments, the travel route can be considered a data path and may correspond to a predefined driving route from one point to another, such as from Seattle to Sacramento.

To navigate the travel route, the user can drag a cursor (e.g., via a mouse or other input device) within the map to provide an approximation of the desired travel route. The path that the cursor takes through the map can be considered a scrub path. While the scrub path may approximate the travel route (e.g., in terms of general driving direction), the scrub path may not necessarily account for one or more variations in the travel route, such as a freeway entrance/exit loop, a bypass, a construction detour, and so on. According to some embodiments, techniques discussed herein can account for variations in a data path (e.g., the travel route) and provide ways of maintaining adjacency between a navigation along the data path and the scrub path.

In one or more embodiments, a data path can be associated with one or more types of data path content, such as text content, advertisements, photographs, video content, audio content, hyperlinks, driving directions, data values, and so on. Using the map example discussed above, one example of data path content can include video content captured along the travel route. Thus, according to some embodiments, techniques discussed herein can cause the video content to be displayed in response to a user indication of the scrub path.

In some embodiments, data path content can also be retrieved and/or filtered based on user-specified parameters, such as one or more user preferences. For example, a user can indicate a preference for particular content, such as seafood restaurants. In such an example scenario, data path content associated with seafood restaurants can be presented to the user responsive to a user indication of a scrub path.

While example embodiments are discussed herein with reference to scrubbing and navigation within a map, this is for purposes of example only. It is to be appreciated and understood that techniques discussed herein may be employed in a variety of different types of navigable content and different implementation scenarios without departing from the spirit and scope of the claimed embodiments. Examples of suitable navigable content and/or implementation scenarios can include 2-dimensional curves that represent one or more different data parameters (e.g., temperature, pressure, and/or mappings to higher-dimensioned spaces), as well as 3-dimensional models (e.g., computer-aided design (CAD) models), virtual reality environments, video game environments, and so on.

In the discussion that follows, a section entitled "Operating Environment" describes but one environment in which the various embodiments can be employed. Following this, a section entitled "Example Scrubbing Techniques" describes example ways of maintaining adjacency between one or more data paths and one or more scrub paths in accordance with one or more embodiments. Next, a section entitled "Example User Interface" describes an example user interface in accordance with one or more embodiments. Following this, a section entitled "Example Methods" describes example methods in accordance with one or more embodiments. Last, a section entitled "Example System" is provided and describes an example system that can be used to implement one or more embodiments.

Operating Environment

FIG. 1 illustrates an operating environment in accordance with one or more embodiments, generally at 100. Environment 100 includes a computing device 102 having one or more processors 104 and one or more computer-readable storage media 106. The computer-readable storage media 106 can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 10.

The computing device 102 also includes a web browser 108, as well as other applications, that can be operable to access, display, and/or interact with various types of navigable content. Examples of other applications include navigation (e.g., GPS) applications, medical applications, graphics applications, and so on. The web browser 108 can also be operable to present (e.g., display) one or more instances of data path content, such as data path content 110. Also included on the computing device 102 is a scrubber module 112 that can implement various techniques described above and below. While the scrubber module 112 is illustrated as separate from the web browser 108 (or other applications), it is to be appreciated and understood that, in some embodiments, the web browser 108 (or other applications) may be configured to implement one or more of the techniques discussed herein.

The computing device 102 is configured to access one or more remote resources via a network 114. The network 114 can include any suitable wired and/or wireless network, such as the Internet, a wide area network, a local area network, and so on. One example of a remote resource is a remote resource 116, which can be accessed to provide a variety of different types of content, such as navigable content and/or data path content. The remote resource 116 can also be configured to perform one or more of the techniques for scrubbing variable content paths discussed herein. For example, the remote resource 116 can host a web-based algorithm and/or web-based service that can be accessed by the computing device 102 to perform one or more techniques discussed herein. Local resources can also be employed in connection with the described embodiments.

Computing device 102 can be embodied as any suitable computing device such as, by way of example and not limitation, a desktop computer, a portable computer, a handheld computer such as a personal digital assistant (PDA), cell phone, and the like. According to one or more embodiments, the computing device 102 can be embodied as a device that is configured to receive touch input. Examples of devices that can be configured to receive touch input include mobile devices, tablet PCs, touchscreen kiosks, and so on. Also, one or more of the techniques discussed herein can be employed to allow disabled individuals to interact with content, such as via a stylus, an appendage, voice input, and so on. Thus, according to some embodiments, techniques discussed herein can enable the scrubbing of content paths via touch input, e.g., via a finger or other appendage.

Having considered an example operating environment, consider now a discussion of example scrubbing techniques for scrubbing variable content paths.

Example Scrubbing Techniques

Figure 2:
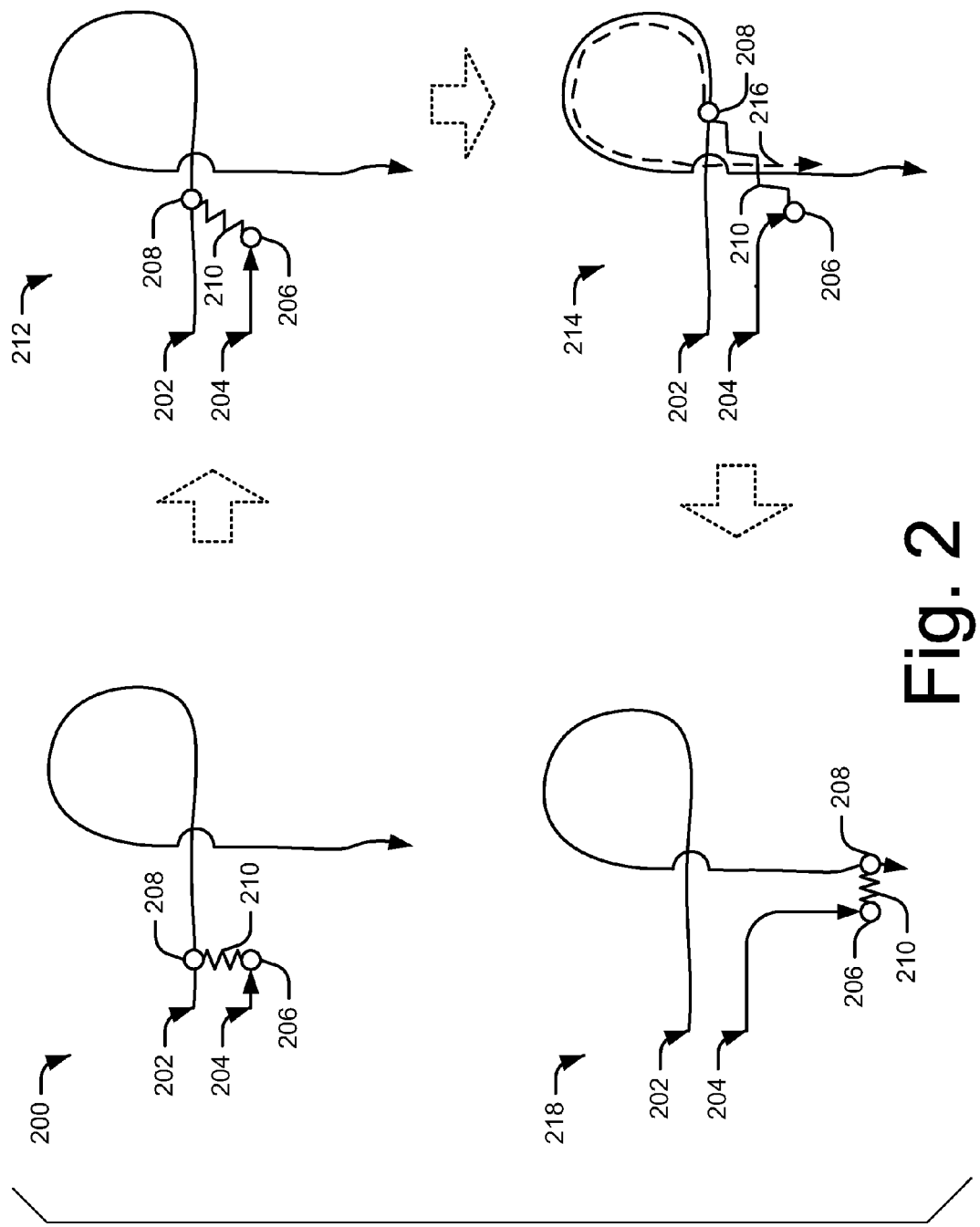
FIG. 2 illustrates an example way of maintaining adjacency between a scrub path and a data path navigation, in accordance with one or more embodiments.

FIG. 2 illustrates an example way of maintaining adjacency between a data path navigation and a scrub path, in accordance with one or more embodiments. Illustrated at 200 are a data path 202 and a scrub path 204. According to some embodiments, the scrub path 204 can be created by dragging a scrub point 206 using a variety of user input techniques or devices, such as, for example, dragging a cursor with a mouse, touch input, audio input, and so on. In some embodiments, dragging the scrub point 206 can cause a data point 208 to navigate along the data path 202. As discussed above, in some embodiments, the data path 202 can correspond to a previously-defined path, such as a travel route, road, highway and the like. As also discussed above, the data path 202 can be associated with one or more of a variety of data path content, and navigation of the data point 208 along the data path 202 can cause one or more instances of data path content to be presented.

In some example embodiments, a relationship between a scrub point and a data point in a data path navigation can be established using a model, e.g. a physics-based model, such as a virtual spring (hereinafter "spring") that joins the scrub point to the data point. The spring can be embodied and/or implemented as a physics-based data module, executable computer-code, and/or any other representation.

In this particular example embodiment, a relationship between the scrub point 206 and the data point 208 is diagrammatically represented as a spring 210. According to one or more embodiments, adjacency between the scrub point 206 and the data point 208 can be determined as a function of a tension associated with the spring 210. The tension on the spring 210 can be quantified using any appropriate unit, such as newtons, pounds, and so on.

Continuing with the current example, at 212 is illustrated a navigation of the data point 208 along the data path 202 responsive to a movement of the scrub point 206. In some example implementations, navigation of the data point 208 along the data path 202 can occur at approximately the same speed as a movement of the scrub point 206. According to some embodiments, a speed of movement of the scrub point 206 can correspond to a speed at which a user drags a cursor and/or provides some other suitable means of input.

Also illustrated at 212 is an increase in spring tension on the spring 210, as illustrated by an elongation of the spring 210. According to some embodiments, a threshold spring tension can be specified that enables adjacency between a navigation of the data point 208 along the data path 202 and the scrub path 204 to be maintained. For example, when the tension on the spring 210 is at or below the threshold tension, the data point can be considered adjacent to the scrub point and the navigation of the data point 208 along the data path 202 can proceed in a direct navigation mode. In some embodiments, a direct navigation mode causes navigation of the data point 208 along the data path 202 to occur at approximately the same speed as the scrub point 206. As a further example, when the tension on the spring 210 is above the threshold tension, the data point can be considered not adjacent to the scrub point and the navigation of the data point 208 along the data path 202 can proceed in an indirect navigation mode. In some embodiments, in an indirect navigation mode, navigation of the data point 208 along the data path 202 accelerates until the tension on the spring 210 equals or falls below the threshold tension.

Illustrated at 214 is a further navigation of the data point 208 along the data path 202 responsive to a further movement of the scrub point 206. In this example implementation, the tension on the spring 210 has exceeded a threshold tension, and an acceleration path 216 (indicated by the dashed line) indicates a switch in a navigation of the data point 208 along the data path 202 from a direct navigation mode to an indirect navigation mode. In one or more embodiments, a switch in navigation modes can occur responsive to a change in spring tension, such as exceeding a threshold tension. In the current example, the switch to the indirect navigation mode causes the data point 208 to accelerate along the data path 202 until the tension on the spring 210 decreases such that the tension equals or falls below the threshold tension.

According to some embodiments, an acceleration of the data point 208 along the data path 202 in an indirect navigation mode can cause a change in presentation of data path content. For example, the indirect navigation mode can cause some data path content to be skipped, e.g., data path content that occurs along the acceleration path 216. In a further example, the indirect navigation mode can cause data path content, such as video content, to increase in playback speed. According to some embodiments, the increase in playback speed can continue until the navigation of the data point 208 returns to a direct navigation mode, at which time the playback of the video content can return to a normal (e.g., real time) playback speed.

In some embodiments, the acceleration of the data point 208 along the data path 202 in an indirect navigation mode can be determined based on the tension on the spring 210. For example, the greater the tension on the spring 210, the greater the acceleration of the data point 208, and vice-versa.

At 218, tension on the spring 210 has decreased to within the threshold tension and the navigation of the data point 208 along the data path 202 has returned to a direct navigation mode. According to some embodiments, a return to a direct navigation mode indicates adjacency between the data point 208 and the scrub point 206.

Figure 3:
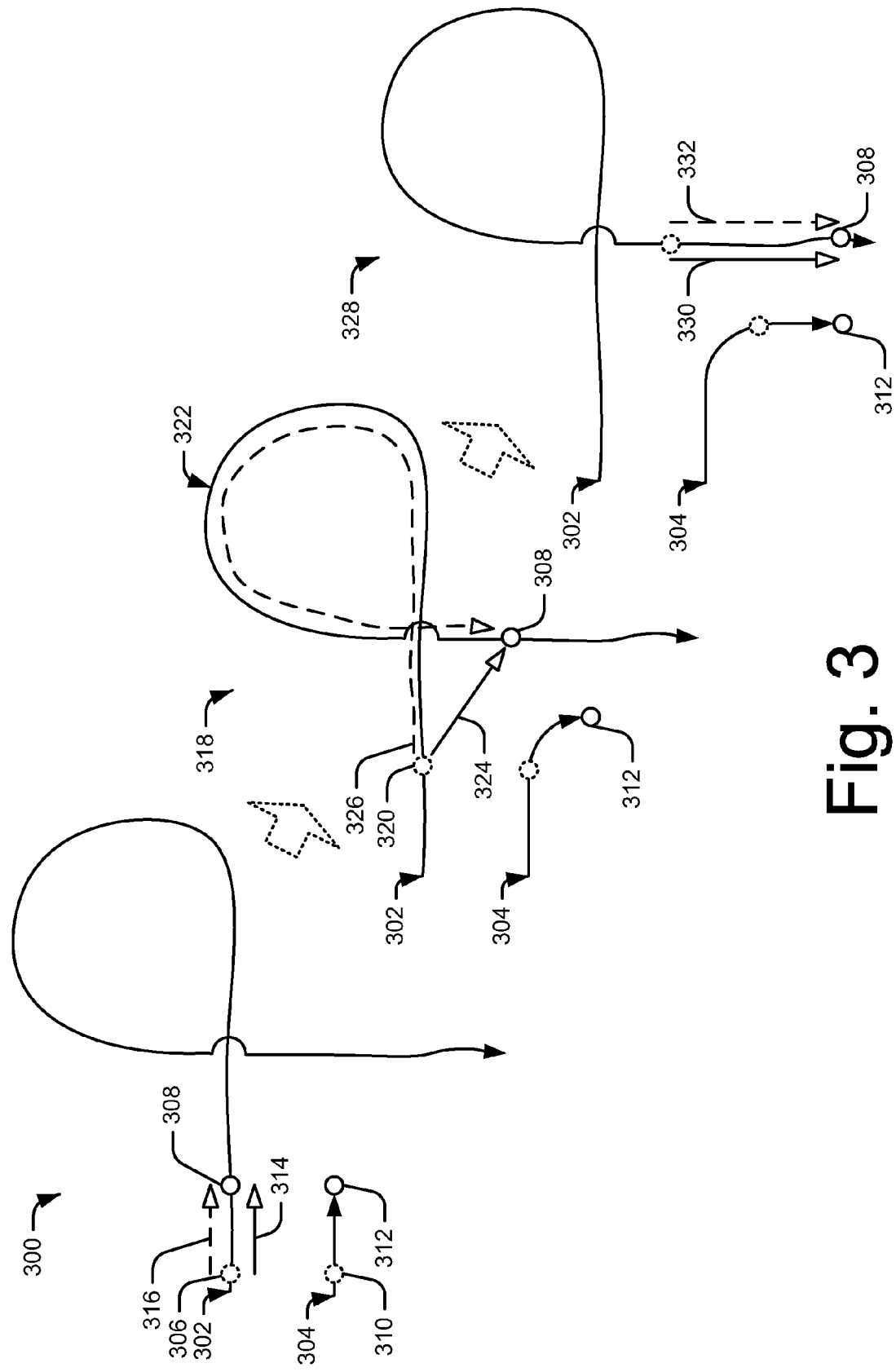
FIG. 3 illustrates an example way of maintaining adjacency between a scrub path and a data path navigation, in accordance with one or more embodiments.

FIG. 3 illustrates another example way of maintaining adjacency between a data path navigation and a scrub path, in accordance with one or more embodiments. At 300 is illustrated a data path 302 and a scrub path 304. The data path 302 includes a data point position 306 that represents a previous position of a data point 308 on the data path 302. The scrub path 304 includes a scrub point position 310 that represents a previous position of a scrub point 312 on the scrub path.

According to some embodiments, a scrub point can drag a data point along a data path using any suitable mechanism, such as a physics-based string that "attaches" the scrub point to the data point. Thus, in this particular example, as the scrub point 312 moves (e.g., in response to a user input), the string drags the data point 308 along the data path 302. In some embodiments, the string causes the data point 308 to stay within a certain distance of the scrub point 312.

In some embodiments, navigation along the data path 302 can be characterized by point-to-point distances and actual path distances. A point-to-point distance refers to a distance between two data point positions, independent of the data path 302 itself. An actual path distance refers to a distance between two data point positions if the data path 302 is followed between the two positions. For example, in the illustration, a point-to-point distance 314 and an actual path distance 316 between the data point position 306 and the data point 308 is shown. In this particular example, the point-to-point distance 314 is approximately equal to the actual path distance 316. According to some embodiments, when a point-to-point distance is approximately equal to an actual path distance, the data point 308 can be considered adjacent to the scrub point 312 and a navigation of a data point along a data path can occur in a direct navigation mode.

At 318, the scrub point 312 has moved to a new position on the scrub path 304 and the data point 308 has moved to a new position on the data path 302. As discussed above, the data point 308 can be attached to the scrub point 312 via a string that maintains the data point 308 within a certain distance of the scrub point 312.

According to some embodiments, when a data point is maintained within a certain distance of a scrub point (e.g., via a string), the data point may occasionally jump between sections of a data path to stay within the certain distance of the scrub point. In the example illustrated at 318, the data point 308 has jumped from a previous data point position 320 to its current position and skipped the loop 322 of the data path 302.

At 318 is also illustrated a point-to-point distance 324 and an actual path distance 326 (illustrated as the dashed line) between the new location of the data point 308 and the previous data point position 320. In this particular example, since the data point 308 jumped positions on the data path 302 and skipped the loop 322, the actual path distance 326 is larger than the point-to-point distance 324. According to some embodiments, a threshold difference can be specified between an actual path distance and a point-to-point distance. If the difference between an actual path distance and a point-to-point distance exceeds the threshold difference, a data point can be considered not adjacent to a scrub point, and a navigation of the data point on a data path can transition from the direct navigation mode to the indirect navigation mode.

In the current example, the difference between the actual path distance 326 and the point-to-point distance 324 has exceeded a threshold difference, and the navigation of the data point 308 has transitioned to an indirect navigation mode. According to some embodiments, a transition from direct navigation mode to indirect navigation mode can cause changes in the presentation of data path content associated with the data path 302. For example, some data path content can be skipped and/or a playback speed of some data path content can be accelerated.

At 328, the scrub point 312 has again moved to a new position on the scrub path 304 and the data point 308 has again moved to a new position on the data path 302. Also illustrated at 328 is a point-to-point distance 330 and an actual path distance 332. In this example, the difference between the actual path distance 332 and the point-to-point distance 330 has returned to within the threshold difference, and thus the navigation of the data point 308 along the data path 302 has returned to a direct navigation mode. According to some embodiments, a return to a direct navigation mode can cause a presentation of data path content to transition from one mode to another. For example, video content playback that was accelerated in response to a transition to indirect navigation mode can return to a normal playback speed.

Having described example user interfaces in accordance with one or more embodiments, consider now a discussion of an example user interface in accordance with one or more embodiments.

Example User Interface

Figure 4:
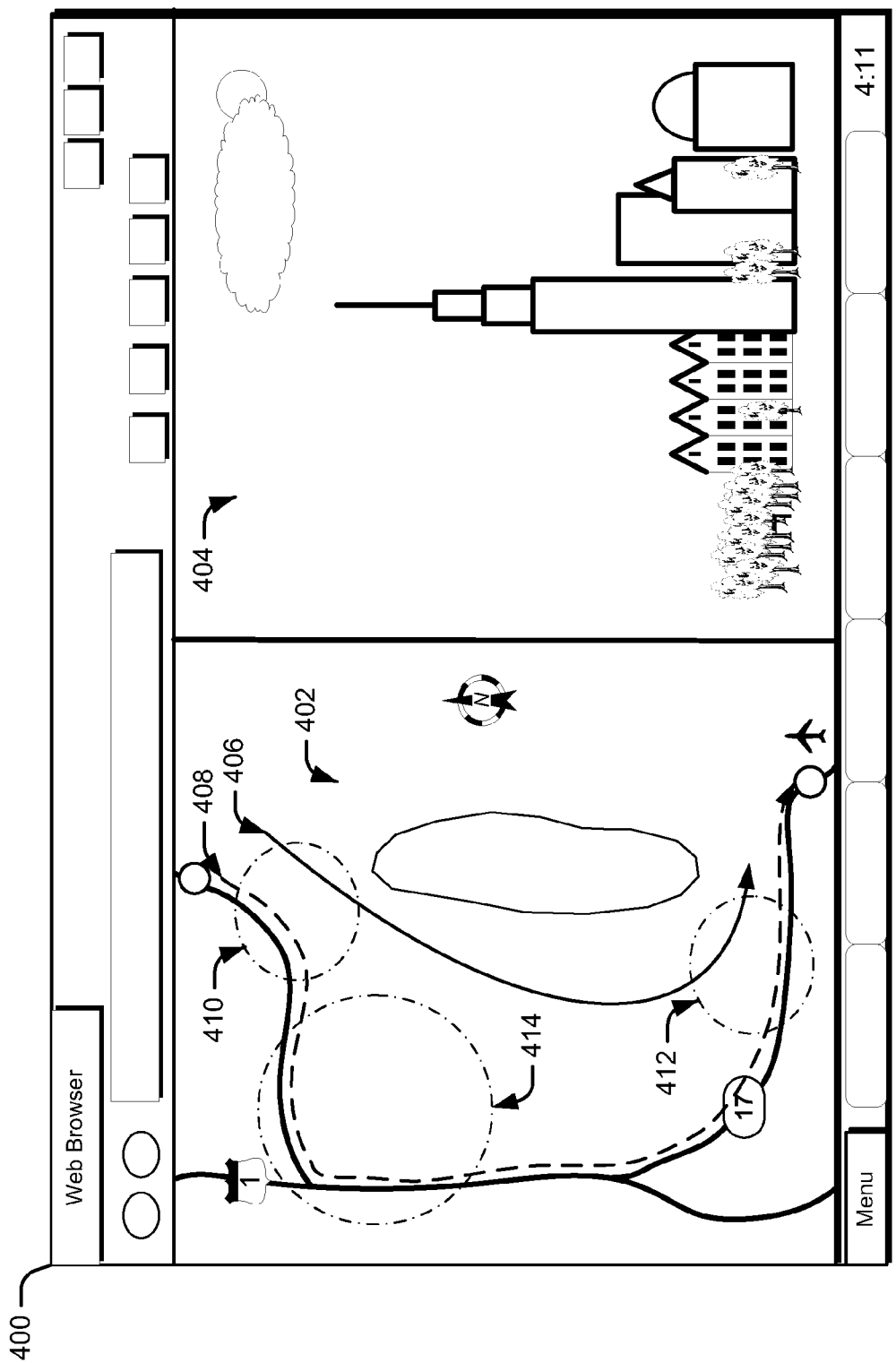
FIG. 4 illustrates an example user interface in accordance with one or more embodiments.

FIG. 4 illustrates an example user interface 400 in accordance with one or more embodiments. User interface 400 is illustrated as a web browser interface for purposes of example only, and any suitable user interface and/or application may be utilized without departing from the spirit and scope of the claimed embodiments.

The user interface 400 includes a navigation region 402 and a content region 404. According to some embodiments, the navigation region 402 is configured to display navigable content and to receive user input regarding the navigable content. In this particular example, the navigable content includes a navigable map. Although, this is for purposes of example only, and other examples of suitable navigable content are mentioned above.

The navigation region 402 includes a scrub path 406 and a data path 408. As discussed above, and in accordance with some embodiments, the scrub path 406 can be generated responsive to user input to the navigation region 402, such as a user's finger or mouse dragging over the navigation region 402. Responsive to generating the scrub path 406, a navigation can occur along the data path 408. According to one or more embodiments, the data path 408 can correspond to a predetermined travel route.

According to some embodiments, navigation of the data path 408 can proceed according to a direct navigation mode and/or an indirect navigation mode. For example, at navigation sections 410 and 412 (encircled by the dashed line), the data path 408 is adjacent to the scrub path 406. Accordingly, in some embodiments, the navigation of the data path 408 at the navigation sections 410 and 412 can proceed according to a direct navigation mode. Further to some embodiments, at a navigation section 414 (encircled by the dashed line), the data path 408 is not adjacent to the scrub path 406. Thus, the navigation of the data path 408 at the navigation section 414 can proceed according to an indirect navigation mode. As discussed above, a navigation of the data path 408 can transition between direct navigation modes and indirect navigation modes according to one or more of the techniques discussed herein.

A navigation of the data path 408 can cause data path content associated with the data path 408 to be presented. Suitable examples of data path content are described above. According to some embodiments, data path content can be presented in a content region 404. The content region 404 can be configured to present any suitable type of data path content. In this particular example, the content region 404 presents video content associated with the data path 408 responsive to a navigation of the data path 408.

The arrangement of visual elements included in the user interface 400 is for purposes of example only, and it is to be appreciated that any suitable arrangement of visual elements may be utilized without departing from the spirit and scope of the claimed subject matter.

Example Methods

Figure 5:
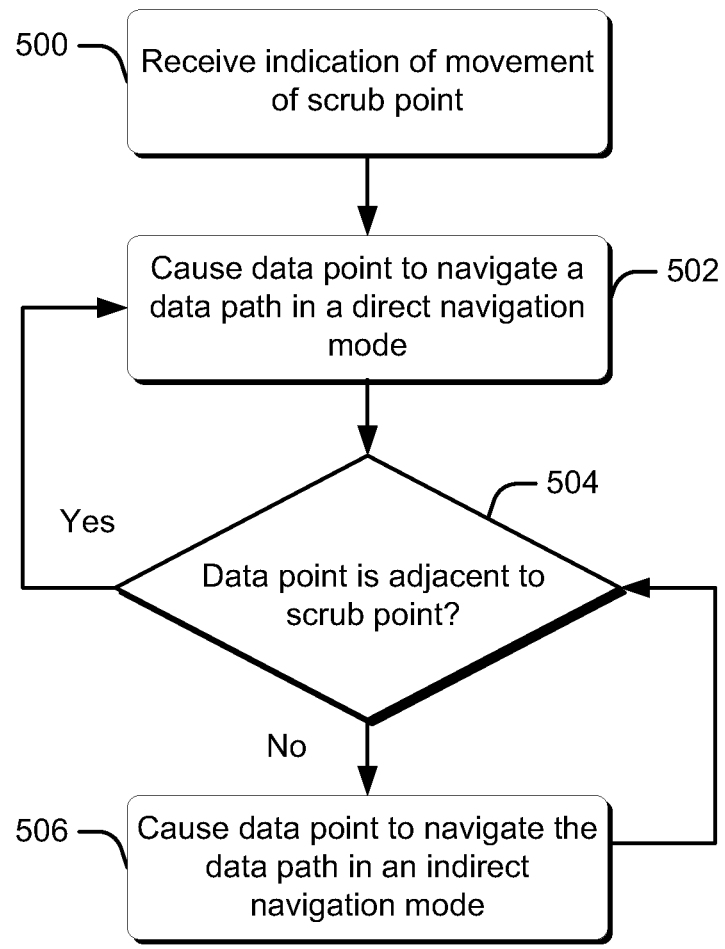
FIG. 5 is a flow diagram that describes steps in a method in accordance with one or more embodiments.

FIG. 5 is a flow diagram that describes a method in accordance with one or more embodiments. The method can be implemented in connection with any suitable hardware, software, firmware, or combination thereof. In at least some embodiments, the method can be implemented by software executing or executable (e.g., the web browser 108 (or other application) and/or the scrubber module 112) to scrub navigable content.

Step 500 receives an indication of movement of a scrub point. According to some embodiments, the movement of a scrub point can be responsive to user manipulation of the scrub point via one or more suitable techniques for user input. Step 502 causes a data point to navigate a data path in a direct navigation mode. As discussed above, in some embodiments the navigation of the data path can be responsive to the movement of the scrub point.

Step 504 determines if the data point is adjacent to the scrub point. If the data point is adjacent to the scrub point ("Yes"), the method returns to step 502. If, on the other hand, the data point is not adjacent to the scrub point ("No"), step 506 causes the data point to navigate the data path in an indirect navigation mode. In accordance with some embodiments, the method can return to step 504 to determine if the data point has achieved adjacency with the scrub point or if the data point can continue navigating in the indirect navigation mode. Example ways for determining if a data point is adjacent to a scrub point are discussed above and below.

Figure 6:
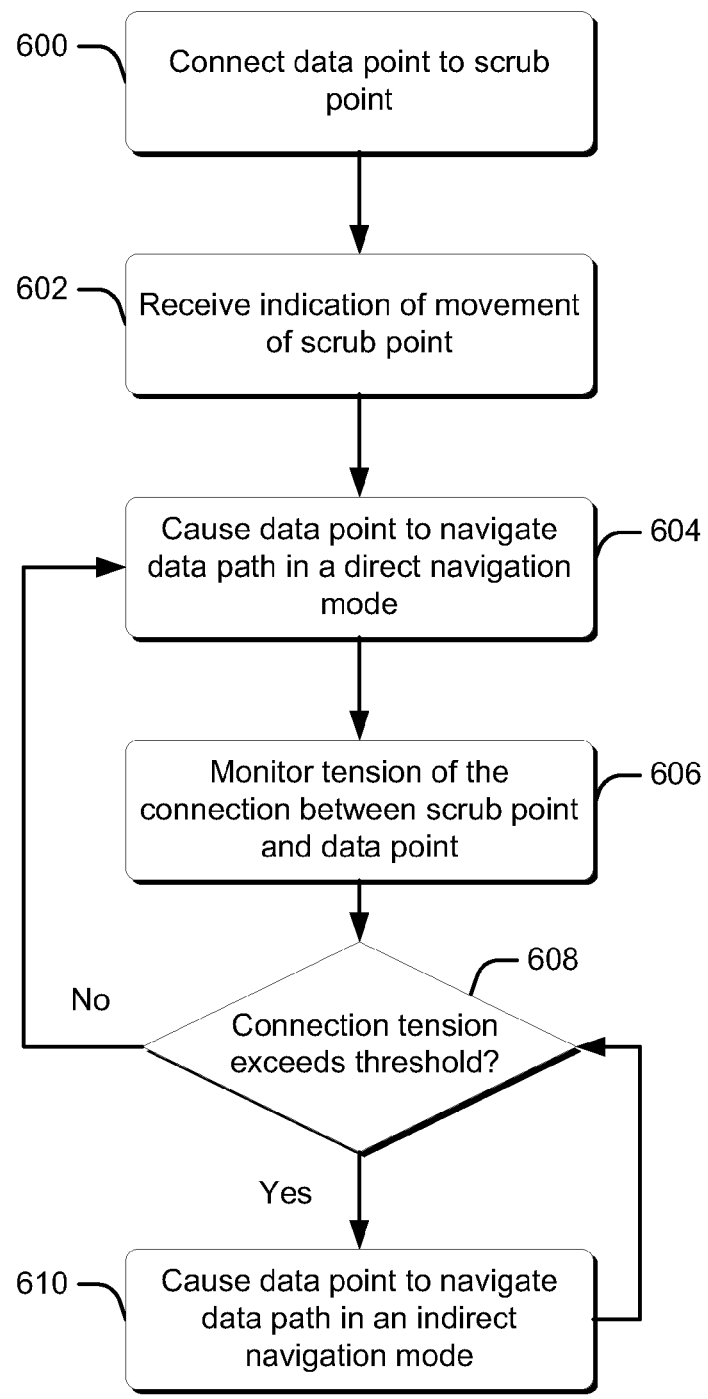
FIG. 6 is a flow diagram that describes steps in a method in accordance with one or more embodiments.

FIG. 6 is a flow diagram that describes a method in accordance with one or more embodiments. The method can be implemented in connection with any suitable hardware, software, firmware, or combination thereof. In at least some embodiments, the method can be implemented by software executing or executable (e.g., the web browser 108 (or other application) and/or the scrubber module 112) to determine if a data point is adjacent to a scrub point in a data path navigation.

Step 600 connects a data point to a scrub point. For example, and as discussed above, a virtual spring can be used to create a virtual connection between a data point and a scrub point. Step 602 receives an indication of movement of a scrub point. Step 604 causes the data point to navigate a data path in a direct navigation mode. Step 606 monitors tension of the connection between the data point and the scrub point.

Step 608 determines if the tension of the connection exceeds a threshold tension. For example, a threshold tension can be specified, e.g., 4 pounds. If the tension does not exceed the threshold tension ("No"), the method returns to step 604. If, however, the tension exceeds the threshold tension ("Yes"), step 610 causes the data point to navigate the data path in an indirect navigation mode. According to some embodiments, the method can return to step 608.

Figure 7:
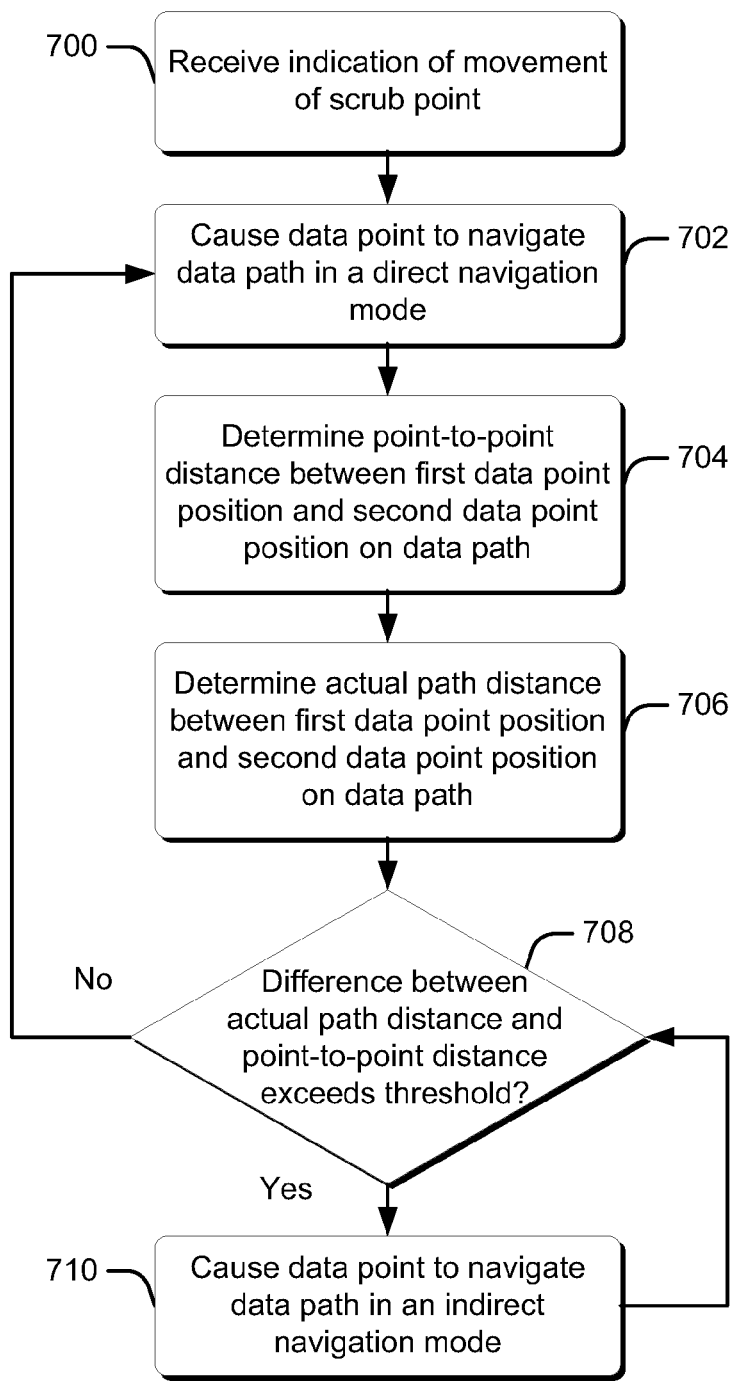
FIG. 7 is a flow diagram that describes steps in a method in accordance with one or more embodiments.

FIG. 7 is a flow diagram that describes a method in accordance with one or more embodiments. The method can be implemented in connection with any suitable hardware, software, firmware, or combination thereof. In at least some embodiments, the method can be implemented by software executing or executable (e.g., the web browser 108 (or other application) and/or the scrubber module 112) to determine if a data point is adjacent to a scrub point.

Step 700 receives an indication of movement of a scrub point. Step 702 causes a data point to navigate a data path in a direct navigation mode. According to one or more embodiments, causing the data point to navigate the data path can occur responsive to receiving the indication of the movement of the scrub point.

Step 704 determines a point-to-point distance between a first data point position and a second data point position on the data path. Step 706 determines an actual path distance between the first data point position and the second data point position on the data path. The point-to-point distance and/or the actual path distance can be determined in terms of pixels, vector lengths, or any other suitable way of determining a distance between points.

Step 708 determines if a difference between the actual path distance and the point-to-point distance exceeds a threshold difference. For example, a threshold difference can be specified of 75 pixels. If the difference does not exceed the threshold ("No"), the method returns to step 702.

If, however, the difference between the actual path distance and the point-to-point distance exceeds the threshold distance, step 710 causes the data point to navigate the data path in an indirect navigation mode. For example, if the distance is above 75 pixels, the navigation of the data path can transition to an indirect navigation mode. According to some embodiments, the method can return to step 708.

Figure 8:
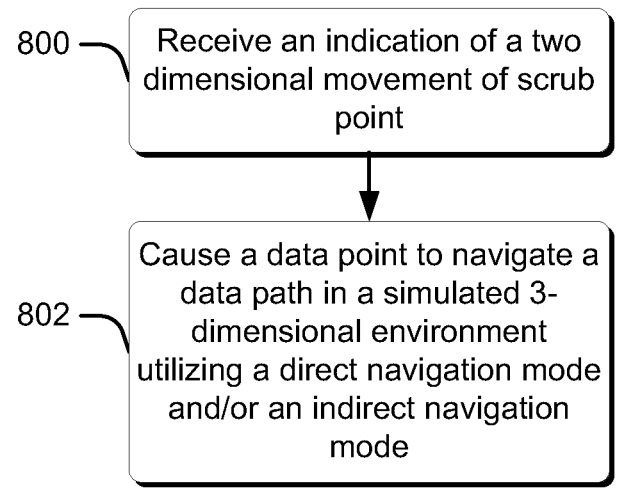
FIG. 8 is a flow diagram that describes steps in a method in accordance with one or more embodiments.

FIG. 8 is a flow diagram that describes a method in accordance with one or more embodiments. The method can be implemented in connection with any suitable hardware, software, firmware, or combination thereof. In at least some embodiments, the method can be implemented by software executing or executable (e.g., the web browser 108 (or other application) and/or the scrubber module 112) to scrub one or more paths in a simulated 3-dimensional environment.

Step 800 receives an indication of a 2-dimensional movement of a scrub point. Step 802 causes a data point to navigate a data path through a simulated 3-dimensional environment utilizing a direct navigation mode and/or an indirect navigation mode. As in the above examples, selection of the direct or indirect navigation modes can be made based upon criteria which is the same as or similar to the criteria mentioned above. Examples of a simulated 3-dimensional environment include CAD models, virtual reality environments, video game environments, and so on.

Figure 9:
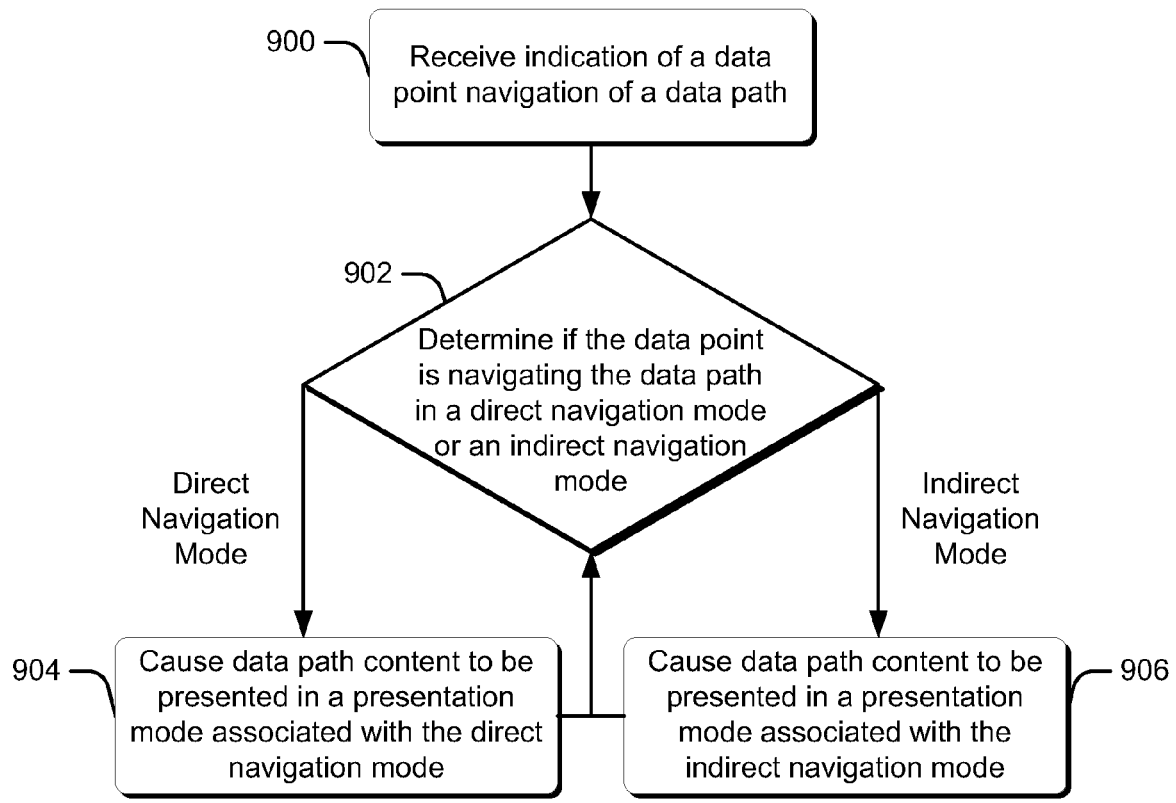
FIG. 9 is a flow diagram that describes steps in a method in accordance with one or more embodiments.

FIG. 9 is a flow diagram that describes a method in accordance with one or more embodiments. The method can be implemented in connection with any suitable hardware, software, firmware, or combination thereof. In at least some embodiments, the method can be implemented by software executing or executable (e.g., the web browser 108 (or other application) and/or the scrubber module 112) to cause data path content to be presented based on a direct navigation mode and/or an indirect navigation mode.

Step 900 receives an indication of a data point navigation of a data path. Step 902 determines if the data point is navigating the data path in a direct navigation mode or an indirect navigation mode. If the data point is navigating the data path in a direct navigation mode, step 904 causes data path content to be presented in a presentation mode associated with the direct navigation mode. For example, in accordance with the direct navigation mode, video content can be played back in a normal (e.g., real time) playback mode. If, however, the data point is navigating the data path in an indirect navigation mode, step 906 causes data path content to be presented in a presentation mode associated with the indirect navigation mode. Continuing with the video playback example, and in accordance with the indirect navigation mode, the video content can be played back in an accelerated playback mode. According to some embodiments, the method can return from each of steps 904, 906 to step 902 to switch between presentation modes based on one or more changes in data path navigation modes.

According to some embodiments, techniques discussed herein can be utilized in scrubbing movement along a graph that includes junctions. For example, when a scrubbed data point approaches a junction on a graph (e.g., where two curves on a graph intersect), a corresponding data point can have the option of following one of several different possible data curves. In one or more embodiments, techniques discussed herein can select a data curve that is closest to the scrub point. In some implementations, if the scrub point is very close to a junction (e.g., within a preset junction threshold), the decision as to which data curve to follow with the data point can be very noisy. In such implementation scenarios, when the scrub point is very close to a junction on a graph, one or more of the techniques discussed herein can wait for the scrub point to proceed past the junction before deciding on which curve to follow. Thus, by waiting until the scrub point moves past the junction, more information can be provided with which to determine an appropriate curve to follow with the data point.

Example System

Figure 10:
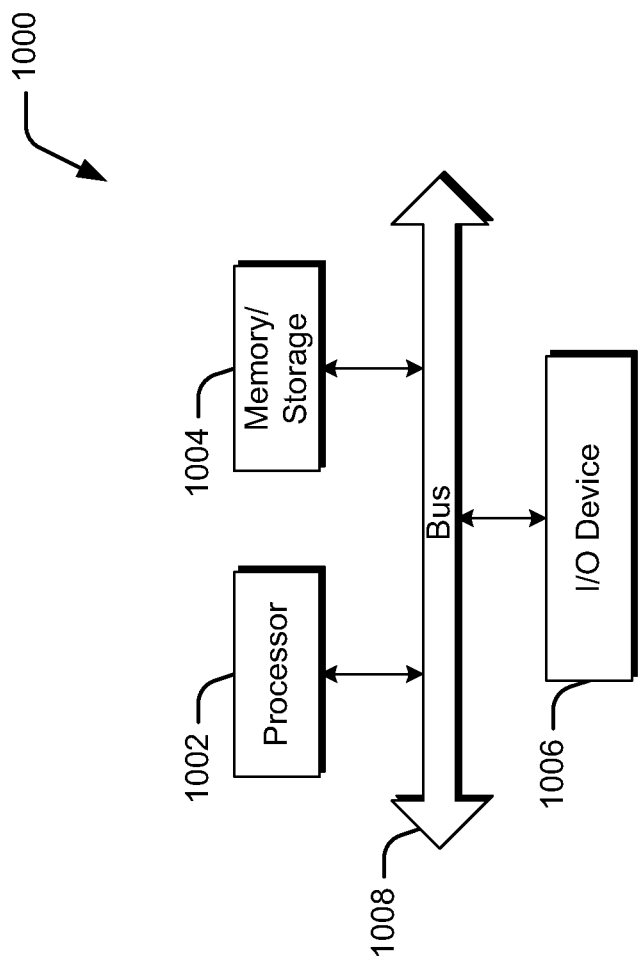
FIG. 10 is a block diagram of a system in accordance with one or more embodiments.

FIG. 10 illustrates an example computing device 1000 that can implement the various embodiments described above. Computing device 1000 can be, for example, computing device 102 of FIG. 1 or any other suitable computing device.

Computing device 1000 includes one or more processors or processing units 1002, one or more memory and/or storage components 1004, one or more input/output (I/O) devices 1006, and a bus 1008 that allows the various components and devices to communicate with one another. Bus 1008 represents one or more of any of several types of bus structures, including a memory bus or memory controller, a peripheral bus, an accelerated graphics port, and a processor or local bus using any of a variety of bus architectures. Bus 1008 can include wired and/or wireless buses.

Memory/storage component 1004 represents one or more computer storage media. Component 1004 can include volatile media (such as random access memory (RAM)) and/or nonvolatile media (such as read only memory (ROM), Flash memory, optical disks, magnetic disks, and so forth). Component 1004 can include fixed media (e.g., RAM, ROM, a fixed hard drive, etc.) as well as removable media (e.g., a Flash memory drive, a removable hard drive, an optical disk, and so forth).

One or more input/output devices 1006 allow a user to enter commands and information to computing device 1000, and also allow information to be presented to the user and/or other components or devices. Examples of input devices include a keyboard, a cursor control device (e.g., a mouse), a touch input device (e.g., a touch screen), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

Various embodiments provide techniques for scrubbing variable paths in content. By way of example and not limitation, scrubbing can include receiving user input that defines a scrub path and navigating a data path through content based on the scrub path. According to some embodiments, a data path can include one or more predefined paths (e.g., a travel route) through the content. One or more of the techniques discussed herein can account for variations in a data path and provide ways of maintaining adjacency between a scrub path and navigation along the data path. In some embodiments, a data path can be associated with one or more types of data path content that can be presented in response to a navigation of the data path.

Although the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter.

What is claimed is:

1. A computer-implemented method comprising:
   receiving, by a computing device, user input to move a scrub point to define a scrub path on a display;
   causing, by the computing device and responsive to the user input, a data point to navigate a data path separate from the scrub path, the data point navigating the data path based on the user input to move the scrub point and in a direct navigation mode, and the data path representing a travel route from one point to a different point on a map;
   determining, by the computing device and based at least in part on a distance between the data point and the scrub point, that the data point is not adjacent to the scrub point due to a variation in the travel route; and
   causing, by the computing device and responsive to said determining that the data point is not adjacent to the scrub point, the data point to transition from navigating the data path in the direct navigation mode to navigating the data path in an indirect navigation mode such that movement of the data point accelerates along the data path until the data point is adjacent to the scrub point; and
   causing, by the computing device and responsive to said determining that the data point is adjacent to the scrub point, the data point to transition from navigating the data path in the indirect navigation mode to navigating the data path in the direct navigation mode, including causing the data point to move along the data path at a speed that corresponds to a speed of movement of the scrub point.

2. The computer-implemented method of claim 1, wherein the user input comprises dragging a cursor.

3. The computer-implemented method of claim 1, wherein, in the direct navigation mode, a speed at which the data point navigates the data path corresponds to a speed of the user input to move the scrub point.

4. The computer-implemented method of claim 1, further comprising:
   causing, with the computing device, one or more instances of data path content to be presented responsive to data path navigation; and
   responsive to the data point navigating the data path in the indirect navigation mode, causing, with the computing device, a change in a presentation mode of the one or more instances of data path content.

5. The computer-implemented method of claim 1, further comprising determining, with the computing device, adjacency of the data point and the scrub point by:
   monitoring, with the computing device, a tension of a connection between the data point and the scrub point; and
   response to a determination that the tension of the connection exceeds a threshold tension, determining, with the computing device, that the data point is not adjacent to the scrub point.

6. The computer-implemented method of claim 1, further comprising determining, with the computing device, adjacency of the data point and the scrub point by:
   determining, with the computing device, a point-to-point distance between a first data point position on the data path and a second data point position on the data path;
   determining, with the computing device, an actual path distance between the first data point position on the data path and the second data point position on the data path; and
   responsive to a determination that a difference between the point-to-point distance and the actual path distance exceeds a threshold difference, determining, with the computing device, that the data point is not adjacent to the scrub point.

7. The computer-implemented method of claim 1, wherein the data path comprises a path in a simulated 3-dimensional environment.

8. The computer-implemented method of claim 1, wherein the user input comprises user input to a graphical user interface (GUI) in which the data path is displayed.

9. The computer-implemented method of claim 1, wherein the user input comprises touch input to a display on which the map is displayed, and the scrub path is defined on a region of the display that is separate from a region in which the data path is displayed.

10. The computer-implemented method of claim 1, wherein the travel route comprises a pre-defined travel route from the one point to the different point.

11. The computer-implemented method of claim 1, wherein the speed that corresponds to a speed of movement of the scrub point comprises a same speed as the speed of movement of the scrub point.

12. A computer-implemented method comprising:
   receiving, by a computing device and via a user interface, an indication of a user manipulation of a scrub point via user input to the user interface to define a scrub path;
   responsive to the manipulation of the scrub point causing, by the computing device, a movement of a data point along a data path that represents a travel route from one point to a different point on a map, the data path being separate from the scrub path and displayed on the user interface;
   determining, by the computing device, that the data point is not adjacent to the scrub point based at least in part on a distance between the data point and the scrub point, the data point not being adjacent to the scrub point being caused by a variation in the travel route; and
   responsive to a determination that the data point is not adjacent to the scrub point, causing, by the computing device, a change in a navigation mode of the data point on the data path displayed on the user interface, the change in the navigation mode causing the data point to accelerate along the data path; and
   responsive to a determination that the data point becomes adjacent to the scrub point, causing the data point to move along the data path at a speed that corresponds to a speed of movement of the scrub point.

13. The computer-implemented method of claim 12, further comprising causing, with the computing device, one or more instances of data path content to be presented on the user interface responsive to the movement of the data point on the data path.

14. The computer-implemented method of claim 12, wherein the change in the navigation mode comprises a change from a direct navigation mode to an indirect navigation mode.

15. The computer-implemented method of claim 14, wherein the change from the direct navigation mode to the indirect navigation mode causes an acceleration in the movement of the data point on the data path.

16. The computer-implemented method of claim 14, further comprising causing a change in a presentation of one or more of instances of data path content based on a change from the direct navigation mode to the indirect navigation mode.

17. A system comprising:
   one or more hardware processors; and
   one or more computer-readable storage media embodying computer-executable instructions that are executable by the one or more hardware processors to perform operations including:
      causing displayable content to be presented based on a data point navigation of a data path in a direct navigation mode, the data point navigation including movement of the data point along the data path in response to user input to move a scrub point that is separate from the data point;
      receiving an indication of a change in the data point navigation of the data path from the direct navigation mode to an indirect navigation mode, the change in the data point navigation caused by the data point becoming non-adjacent to the scrub point such that the data point accelerates along the data path;
      causing a change in a presentation mode of the displayable content based on the change to the indirect navigation mode, the change in presentation mode causing one or more of an acceleration of a playback speed of the displayable content or at least some of the displayable content to be skipped while the data point navigates the data path in the indirect navigation mode; and
      responsive to an indication that the data point is adjacent to the scrub point such that the data point navigation along the data path returns to the direct navigation mode, causing the presentation mode of the displayable content to return to a previous presentation mode.

18. The system of claim 17, wherein the displayable content comprises video content.

19. The system of claim 17, wherein
   the previous presentation mode includes a real-time playback of the displayable content.

20. The system of claim 17, wherein the data path comprises a travel route, and wherein the displayable content comprises video content captured at one or more locations along the travel route.

* * * * *